US007822717B2

(12) United States Patent
Kapoor et al.

(10) Patent No.: US 7,822,717 B2
(45) Date of Patent: Oct. 26, 2010

(54) POINT-IN-TIME DATABASE RESTORE

(75) Inventors: Aditya Kapoor, Bellevue, WA (US);
Wenlu Ma, Sammamish, WA (US);
Craig G. Duncan, Issaquah, WA (US)

(73) Assignee: EMC Corporation, Hopkinton, MA (US)

( * ) Notice: Subject to any disclaimer, the term of this patent is extended or adjusted under 35 U.S.C. 154(b) by 145 days.

(21) Appl. No.: 11/348,982

(22) Filed: Feb. 7, 2006

(65) Prior Publication Data

US 2007/0185922 A1    Aug. 9, 2007

(51) Int. Cl.
*G06F 7/00* (2006.01)
*G06F 17/00* (2006.01)
(52) U.S. Cl. ...................................................... 707/680
(58) Field of Classification Search ................... 707/202, 707/204, 999.202, 999.204, 680; 711/162
See application file for complete search history.

(56) References Cited

U.S. PATENT DOCUMENTS

| | | | | |
|---|---|---|---|---|
| 5,751,997 | A * | 5/1998 | Kullick et al. ............... | 711/162 |
| 2002/0059505 | A1* | 5/2002 | St. Pierre et al. ........... | 711/162 |
| 2003/0200480 | A1* | 10/2003 | Beattie ........................ | 714/13 |
| 2005/0223043 | A1* | 10/2005 | Randal et al. ............... | 707/200 |
| 2005/0273650 | A1* | 12/2005 | Tsou ............................ | 714/6 |
| 2006/0179083 | A1* | 8/2006 | Kulkarni et al. ............. | 707/204 |

OTHER PUBLICATIONS

Document from website SQL Server 2005 Books Online: mshelp://MS.SQLCC.v9/MS.SQLSVR.v9.en/udb9/html/f565198c-d986-4260-a881-63df271f6aeb.htm.

* cited by examiner

*Primary Examiner*—Mohammad Ali
*Assistant Examiner*—Alexey Shmatov
(74) *Attorney, Agent, or Firm*—Workman Nydegger

(57) ABSTRACT

This disclosure concerns systems and methods for restoring data. In one example, a method for restoring a database to a particular state begins when a query is sent to a backup server requesting a list of all backup versions for the database. Next, the list of all backup versions is received from the backup server. Then, the time $t_0$ at which the most recent backup version in the list was created is determined. Next, a point in time $t_2$ subsequent to time $t_0$ is identified. Finally, a command set that, when executed, functions to restore the database to the state that existed at time $t_2$ is automatically formulated.

20 Claims, 9 Drawing Sheets

POINT-IN-TIME DATABASE RESTORE

BACKGROUND OF THE INVENTION

1. The Field of the Invention

The present invention relates to systems and methods for restoring data in a database. More particularly, embodiments of the invention relate to systems and methods for restoring database data to a particular state corresponding to a specific point in time.

2. Related Technology

A database backup operation results in a duplicate copy of the data in a database. In the event of data corruption or data loss, the duplicate copy of the database data can be used to restore the database to the state the database existed in at the time that the backup operation was performed on the database. However, database backup operations can place a heavy demand on database system resources. Consequently, backup operations are generally performed periodically instead of continuously. This periodic backup schedule can result in data loss, however, when the database is modified subsequent to the most recent backup operation performed on the database. When the database is restored using the data contained in the backup copy of the database, those modifications to the database made subsequent to the most recent backup operation are lost.

Modifications, also known as transactions, made to a database are sometimes stored in a transaction log. A transaction log typically records information regarding each transaction executed on the database, such as the time that a transaction finished executing and the exact modification made to the database when the transaction was executed. Likewise, the sequence that each transaction was executed on the database is generally recorded in the transaction log. Some database backup operations create a duplicate copy of the data in the database, while other database backup operations simply create a copy of the transaction log or create a copy of only the data that has changed since the last full backup operation. A copy of the transaction log can be used in combination with a duplicate copy of the data in the database in restoring the data in the database.

At times, it may be desirable to restore the database to a point in time subsequent to the time of the most recent backup operation on the database. For example, if a transaction within the database subsequent to the most recent backup entered some data incorrectly, it would be desirable to restore the database to the state the database was in just prior to the incorrect entry. Sometimes a restore operation is necessary because of an unintentional loss or corruption of data. When an unintentional loss or corruption of data is identified by a user, it would be desirable to allow the user to restore the database to the database state that existed just prior to the unintentional loss or corruption of data.

One problem with current implementations of point-in-time restore operations is that a database administrator is often required to manually formulate and manually send one or more command line database queries to the database system before each stage of the point-in-time restore operation. These queries are required in order to determine which backup or backups to restore and, where there are multiple backups, the order in which to restore the backups. Since a point-in-time restore operation may require that multiple backups be restored in a certain order, a database administrator can, at an intermediate stage of the point-in-time restore, lose track of which backups have been restored and which backups remain unrestored. The only way a database administrator can determine which backups are still unrestored is to manually formulate one or more queries requesting this information from the database system. The formulation of database queries is time consuming and database administrators can make mistakes in syntax that can cause the query to return an error or return erroneous results. The inability to automatically determine which backups are unrestored at any point in point-in-time restore operation makes the task of executing a point-in-time restore operation burdensome and inefficient for a database administrator.

Another problem with current implementations of point-in-time restore operations is that, in order to restore each backup version, the database administrator is required to formulate a complex command line database command. The formulation of database commands presents obstacles similar to the formulation of database queries. Formulating a database command is time consuming and a database administrator can make mistakes in syntax that can cause the command, when executed, to return an error or return erroneous results. The requirement that a complex command be formulated in order to restore each backup version during a point-in-time restore operation makes the task of executing each stage burdensome and inefficient for a database administrator.

Yet another problem with current implementations of point-in-time restore operations is that the database administrator may need to make a backup copy of the transaction log of the database just prior to beginning the point-in-time restore operation. Where the desired point in time for the restore operation is after the most recent backup of the database, the only way to restore the database to the desired point in time is to make a backup copy of the transaction log before restoring any of the database backup versions, since restoring the database backup versions overwrites the database and therefore the transaction log is deleted from the database. A database administrator might forget to make a backup of a the transaction log before beginning the database restore operation, and thereby foreclose the possibility of a point-in-time restore operation where the desired point in time is subsequent to the time of the most recent backup of the database. Likewise, even where the database administrator does remember to make a backup copy of the transaction log, doing so requires the database administrator to formulate a complex transaction log backup command. Formulation of this command is time consuming and a database administrator can make mistakes in syntax that cause the command to fail when executed. The requirement that a complex command be formulated in order to backup the transaction log prior to beginning a point-in-time restore operation makes this task burdensome and inefficient for a database administrator.

BRIEF DESCRIPTION OF THE DRAWINGS

To further clarify various aspects of exemplary embodiments of the present invention, a more particular description of the invention will be rendered by reference to specific exemplary embodiments thereof which are illustrated in the appended drawings. It is appreciated that these drawings depict only exemplary embodiments of the invention and are therefore not to be considered limiting of its scope. The drawings are not drawn to scale. The invention will be described and explained with additional specificity and detail through the use of the accompanying drawings in which.

DETAILED DESCRIPTION OF EXEMPLARY EMBODIMENTS OF THE INVENTION

I. An Exemplary Database Operations System

Figure 1:
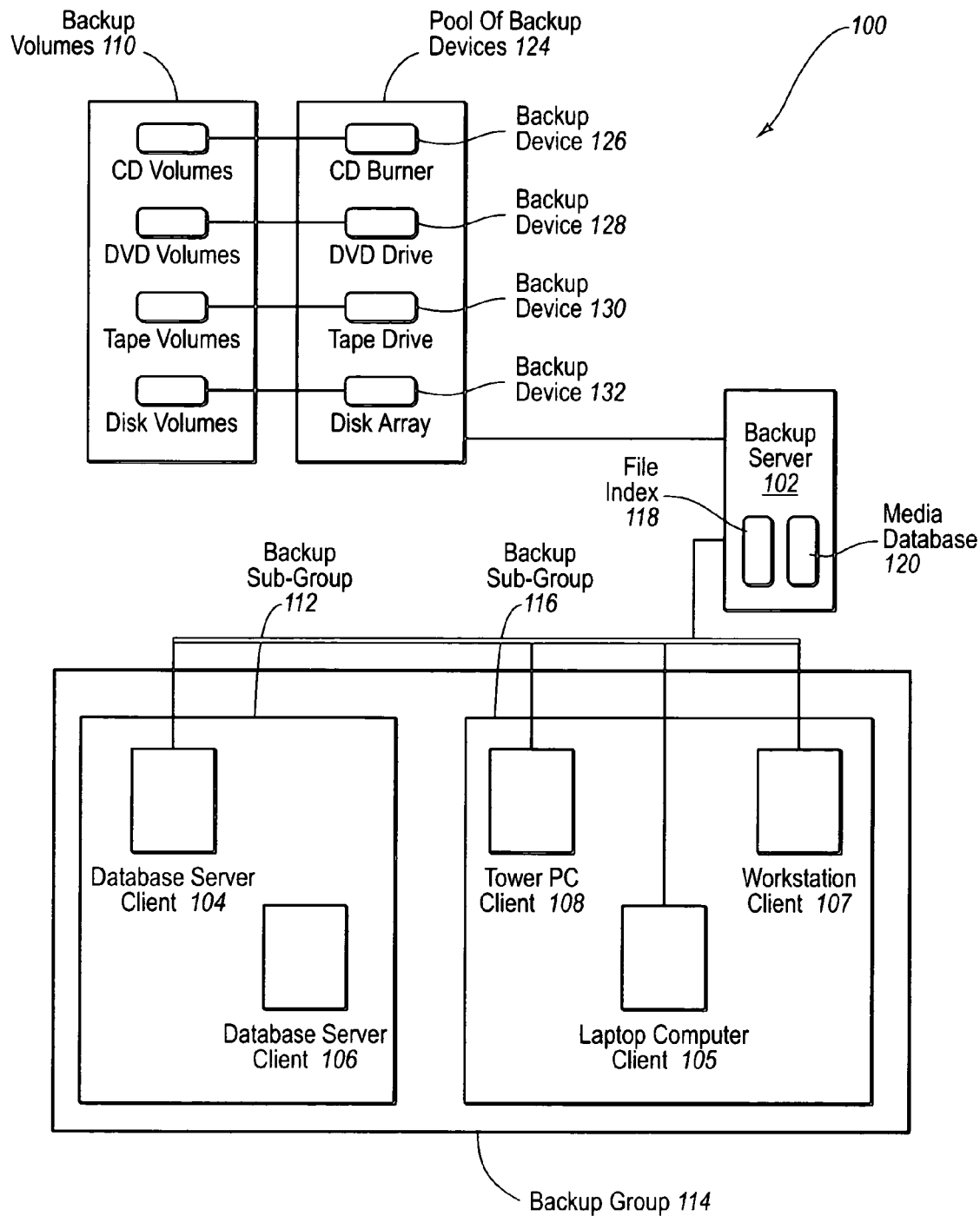
FIG. 1 illustrates an exemplary system for backing up file system data within a network.

One operational environment suitable for embodiments of the present invention is shown in FIG. 1. FIG. 1 illustrates an exemplary file system data backup and recovery system ("DBRS") 100 which generally functions to reproduce online file system data at a storage location and maintains location and obsolescence tracking information about the data. If the online version of the data is lost or corrupted, DBRS 100 can restore the data. In the event that the network in which DBRS 100 operates experiences a disaster, DBRS 100 can restore all DBRS 100 file systems to their original respective structures, as the file systems existed when written to storage.

An exemplary embodiment of DBRS 100 includes three basic components: a backup server 102, one or more clients 104, 105, 106, 107 and 108, and backup volumes 110 of data. Backup server 102 and clients 104, 105, 106, 107, and 108 are the entities which have the software necessary to run the DBRS 100 operations. Backup server 102 includes the programs and services that organize and manage the DBRS 100 functions. Clients 104, 105, 106, 107, and 108 include the programs and services that execute the DBRS 100 functions.

Backup server 102 manages data for its set of clients, such as client 104, 105, 106, 107 and 108. Clients 104, 105, 106, 107, and 108 represent machines on the network which deliver files to be backed up. Backup server 102 may incorporate the use of respective backup groups 112, 114, and 116 to organize the clients/data. Backup groups refer to sets of clients and/or data that are backed up together as a group. A single client can be included in multiple backup groups, exemplified by backup sub-group 112 and backup group 114.

To manage the data that is backed up from clients 104, 105, 106, 107, and 108, DBRS 100 relies on data tracking information, represented in FIG. 1 by a file index 118 and a media database 120 of backup server 102. The entries in file index 118 and media database 120 maintain content and location information describing all the data, both client machines and files, that has been backed up in the DBRS 100 environment.

File index 118 of backup server 102 is a browseable list of backed-up files organized according to each client. Each file on each client in the network that is backed up is listed in file index 118. An entry in file index 118 includes information about the file such as the file type, the time at which the file was backed up, and other information relating to the file, such as the client machine hosting the original file. Because a file may be backed up multiple times and the backup copies may be stored in multiple locations, an entry for a file in file index 118 may contain information concerning the backup location and time of backup for each backed up version of the file. The information in file index 118 concerning multiple backup locations and backup times for a particular file enables a user to identify a specific version of the file for retrieval. Entry information concerning multiple backups of a file can remain in file index 118 for any amount of time determined by an administrator.

While file index 118 tracks information concerning individual files, media database 120 tracks the locations at which the files are stored. In other words, media database 120 contains references to media storage locations. In operation, media database 120 receives an entry each time a backup group 112, 114, or 116 is backed up to a storage volume on DBRS 100. Just as with entries in file index 118, each entry will remain in media database 120 until an administrator removes the entry. Entries in media database 120 can also be removed if the corresponding data is overwritten.

Once the location information concerning the data is known, the data can be stored in different ways. For example, the data can be stored in media volumes on devices such as tape drives, hard disks, or removable disks accessible from backup server 102, as shown in FIG. 1, or accessible by way of a remote server. In an exemplary system for backing up data, data is stored in volumes on devices, as exemplified by backup volumes 110 and a pool 124 of backup devices 126, 128, 130 and 132. An example of storing data by device and volume is storing data on a disk array, with the data storage sub-grouped into disks. Another example of storing data by device and volume is storing data on a tape drive, with the data storage sub-grouped into specific tape volumes. A final example of storing data by device and volume is storing data on a remote server with the data storage sub-grouped into hard disks on the server. Although these examples are helpful in understanding possible configurations of devices and volumes, the ability of DBRS 100 to store data in devices and volumes is not limited to the examples given. In the most general sense, backup devices 126, 128, 130 and 132 of the pool 124 refer to a conceptual model of ways for storing data that are not limited to specific systems or devices.

The usefulness of backup devices 126, 128, 130 and 132 within DBRS 100 is further enhanced by the ability of backup devices 126, 128, 130 and 132 to store data of various types. Specifically, backup devices 126, 128, 130 and 132 can contain data of every file type. For example, backup copies of image files, program execution files, and document files can be stored together in backup devices 126, 128, 130 and 132.

One underlying aspect of backup devices 126, 128, 130 and 132 is the ability of backup devices 126, 128, 130 and 132 to speed retrieval of backed-up files in DBRS 100. For example, when a user requests a restore of a backed-up file, DBRS 100 can quickly retrieve the file if the file index 118 and media database 120 entries for the file contain highly specific location information including reference to backup devices 126, 128, 130 and 132, and the particular media that was used, such as, for example, the tape, CD, DVD, or other media that was used to store the file.

With regard to many features, including backing up to backup devices 126, 128, 130 and 132, DBRS 100 is initially configured to execute functions independently. However, an administrator has many capabilities to control the DBRS 100 functionality. Thus, an administrator can segregate files for storage according to different client and/or file characteristics and can define when a backup volume has become obsolete and should be removed. For example, an administrator could configure DBRS 100 to remove a backup volume from media database 120 after a specified period of time has elapsed since the backup was created. An administrator can also define backup groups 112, 114, and 116, which could include one or more clients and their files, directories, or file systems, or all the files on a client machine.

When accessing clients 104, 105, 106, 107, and 108, the administrator can work within an administrator GUI (not shown). The administrator GUI can be displayed on any DBRS 100 machine, allowing an administrator to interface with, and broker services for, any client 104, 105, 106, 107, or 108, regardless of the client platform. Another important aspect of the capabilities of an administrator involves the ability to specify the application environment. For example, an administrator can create records that specify instructions such as backup devices DBRS 100 will use and the number of clients defined. An administrator can also specify rules that the application will enforce within the backup and recovery environment, including backup scheduling and how long data will be protected before it is recycled.

In addition to administrator capabilities, DBRS 100 also incorporates a system for recovery of lost data. When client data is lost or corrupted, users or an administrator can browse the recoverable files in file index 118 and then create a report to describe the status of the lost data or the location, tracked by media database 120, of the contents in the volumes on backup devices 126, 128, 130 and 132. As discussed in further detail below, the user can then recover the lost data to a user specified point in time. When a request is made to recover lost data, DBRS 100 locates the data sought and directs recovery of the file(s). Data can be recovered to client 104, 105, 106, 107, or 108 where the data originated, or to another specified client.

Furthermore, DBRS 100 has the ability to perform in heterogeneous environments and can run on a variety of different platforms. For example, backup software on a UNIX® server can support Windows® clients or vice-versa. Backup data for any device or volume related to a client can be read and the data of the device or volume can be restored to a user-specified point in time by any DBRS 100 server, regardless of the server platform. Backup data from any system client 104, 105, 106, 107, or 108 can coexist in a single backup device or on a single media set, regardless of the platform of client 104, 105, 106, 107, or 108.

II. An Exemplary Database System

The exemplary DBRS 100 outlined above performs backup and restore operations on files on a network. In addition to the capabilities of the exemplary system discussed above, the exemplary DBRS can support a variety of additional applications and features. One such application incorporates database backup and restore operations.

Figure 2:
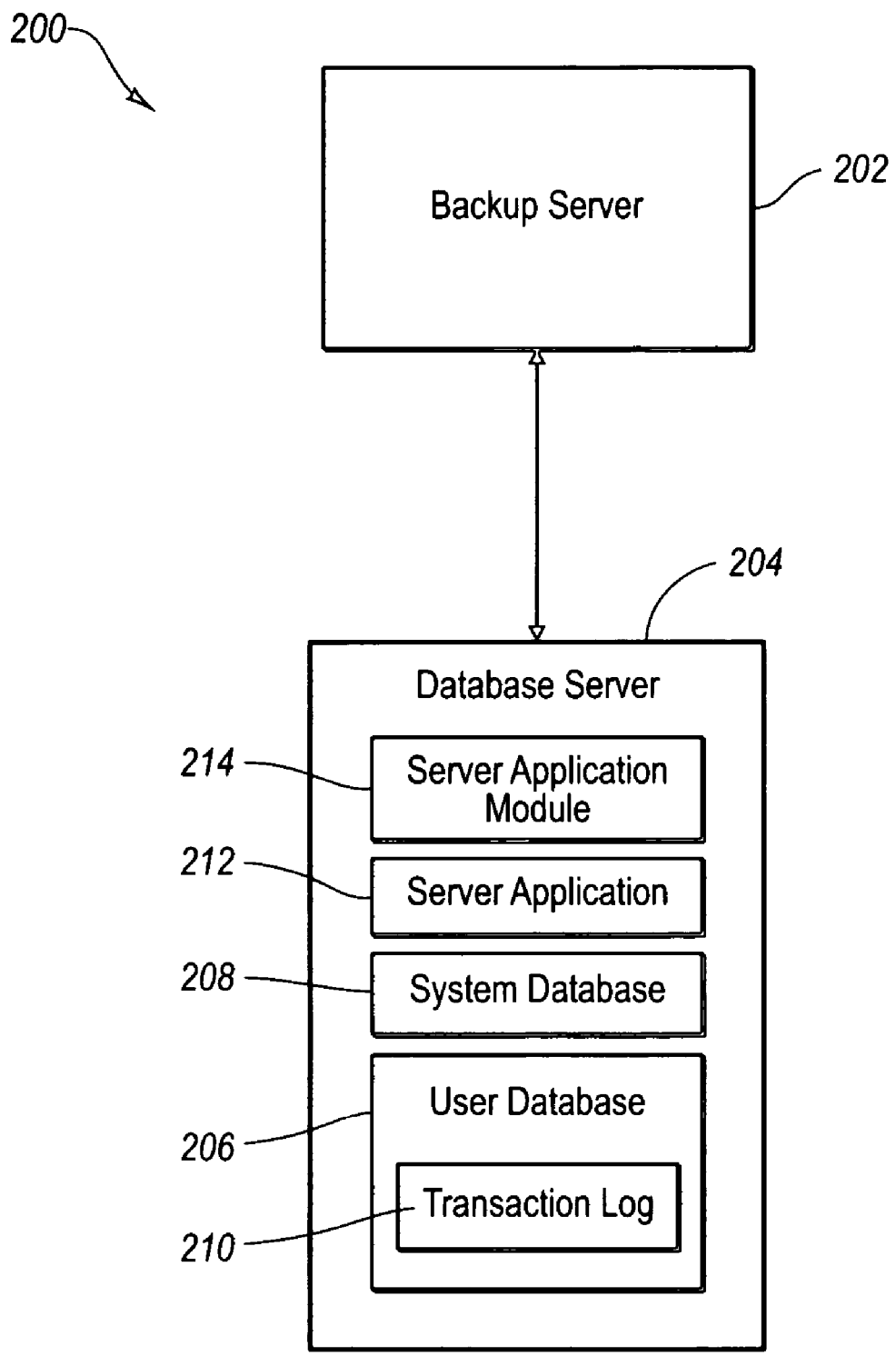
FIG. 2 illustrates an exemplary database system.

An exemplary database system 200 is shown in FIG. 2. Database system 200 includes a backup server 202, which corresponds to backup server 102 shown in FIG. 1. Database system 200 also includes database server 204. Database server 204 includes user database 206 and system database 208. One type of system defined data contained in user database 206 is information regarding each transaction that is executed on user database 206. The term "transaction" as used in this application is defined as any modification to data in a database or any modification to the structure of a database. Some examples of transactions are adding data to a database, updating data in a database, deleting data from a database, adding a table to a database, or modifying the relationship between two tables in a database. The file in user database 206 which contains information concerning each transaction executed on user database 206 is represented by a transaction log 210. One key piece of information stored in transaction log 210 is the time at which each transaction finished executing on user database 206, also known as the timestamp of the transaction.

Before a transaction is executed on user database 206, server application 212 updates transaction log 210 of user database 206 with information concerning the transaction. Server application 212 continually monitors user database 206 and records each transaction executed on user database 206 in transaction log 210 of user database 206 just prior to the execution of each transaction. For example, before a piece of data is deleted from user database 206, this delete transaction is detected by server application 212 and recorded in transaction log 210 of user database 206.

Although FIG. 2 depicts the transaction log 210 corresponding to user database 206 as residing in user database 206, transaction log 210 could reside in system database 208, or elsewhere. It is contemplated that the location of transaction log 210 could be in a database entirely separate from user database 206 and system database 208. Likewise, transaction log 210 need not reside on database server 204 in order to function as a depository for information concerning each transaction executed on user database 206. Thus, alternate locations for transaction log 210 are contemplated as being within the scope of the invention.

Database server 204 of database system 200 also includes server application module 214. A module, such as server application module 214, is a piece of code capable of performing a function, such as backup and/or restore of user database 206 or system database 208. For example, the function performed by server application module 214 could be a backup and/or restore of Microsoft SQL Server databases, in which case user database 206 and system database 208 are Microsoft SQL Server databases, and server application 212 is a Microsoft SQL Server application. Although exemplary database system 200 may be used in conjunction with Microsoft SQL Server databases and applications, exemplary database system 200 is not limited to use with Microsoft SQL Server databases and applications. The functions performed by server application module 214, within database server 204, are an integral part of backup and restore operations within database system 200.

A backup operation or restore operation can be initiated by a user of database system 200 or by backup server 202. When a backup operation on user database 206 is initiated, backup server 202 sends a backup command to server application module 214 located on database server 204. Server application module 214 then performs the backup operation on user database 206. Likewise, when a restore operation on user database 206 is initiated, backup server 202 sends a restore command to server application module 214 located on database server 204. Server application module 214 then performs the restore operation on user database 206. Alternatively, it is contemplated that a backup operation or a restore operation could originate at database server 204 itself. Therefore, the command to perform a backup or restore operation need not be sent from backup server 202, but could be initiated directly on database server 204.

Backup and restore operations performed on user database 206 sometimes require information concerning transactions that have been executed on user database 206. Of particular interest are transactions that have been executed on user database 206 subsequent to the most recent backup of database 206. As noted earlier, information regarding the transactions executed on user database 206 is stored in transaction log 210 of user database 206. Server application module 214 can access this information by contacting server application 212 which reads from transaction log 210 regarding the transactions executed on user database 206. Information regarding transactions executed on user database 206 is logically organized in transaction log 210 of user database 206 sequentially according to the time that each transaction completed execution on user database 206.

III. Database State

Each time that a transaction is executed on a database, the state of the database changes. The impact that the execution of database transactions has on database state is illustrated in an exemplary timeline 300 of FIG. 3A. Timeline 300 begins at time 302 where a backup operation is performed on the database. Timeline 300 ends at time 304 where a restore operation is performed on the database. At time 302 when the backup operation is performed on the database, the database is in an initial database state 306.

In between the performance of the backup and restore operations, several transactions, transactions A, B, C, and n, are executed at times 308, 310, 312, and 314, respectively. After each transaction is executed on the database, the database state changes. For example, as a result of transaction A having been executed at time 308, the database changes from initial database state 306 to a database state A' 316. Likewise, after transaction B is executed at time 310, the database changes from database state A' 316 to a database state B' 318. Similarly, after transaction C is executed at time 312, the database changes from database state B' 318 to a database state C' 320. Finally, the execution of the nth transaction at time 312 results in a database state n' 322.

When the database is restored using only the most recent database backup, the database is restored to the initial database state 306, which was the database state at time 302 when the backup operation was performed. Similarly, when the database is restored using the most recent database backup and all transaction performed on the database, the database is restored to database state n' 322, which was the database state at time 304 when the restore operation was performed. However, under certain circumstances, it would be desirable to restore a database to a database state in between the initial database state 306 and database state n' 322. One such circumstance might be where critical data is unintentionally deleted from the database.

For example, assume transaction C, executed at time 312, represents the unintentional deletion of a critical table in the database. This transaction will result in database state C', in which state the database is missing the critical table deleted during transaction C at time 312. In this example, it would be desirable to restore the database to database state B' 318, and thereby restore the deleted critical table to the database. This database restore can be accomplished by restoring the database to a point in time just prior to time 312. Functionally, this database restore would involve first restoring the database to the initial database state 306, and then reexecuting transaction A and transaction B on the database.

Figure 3A:
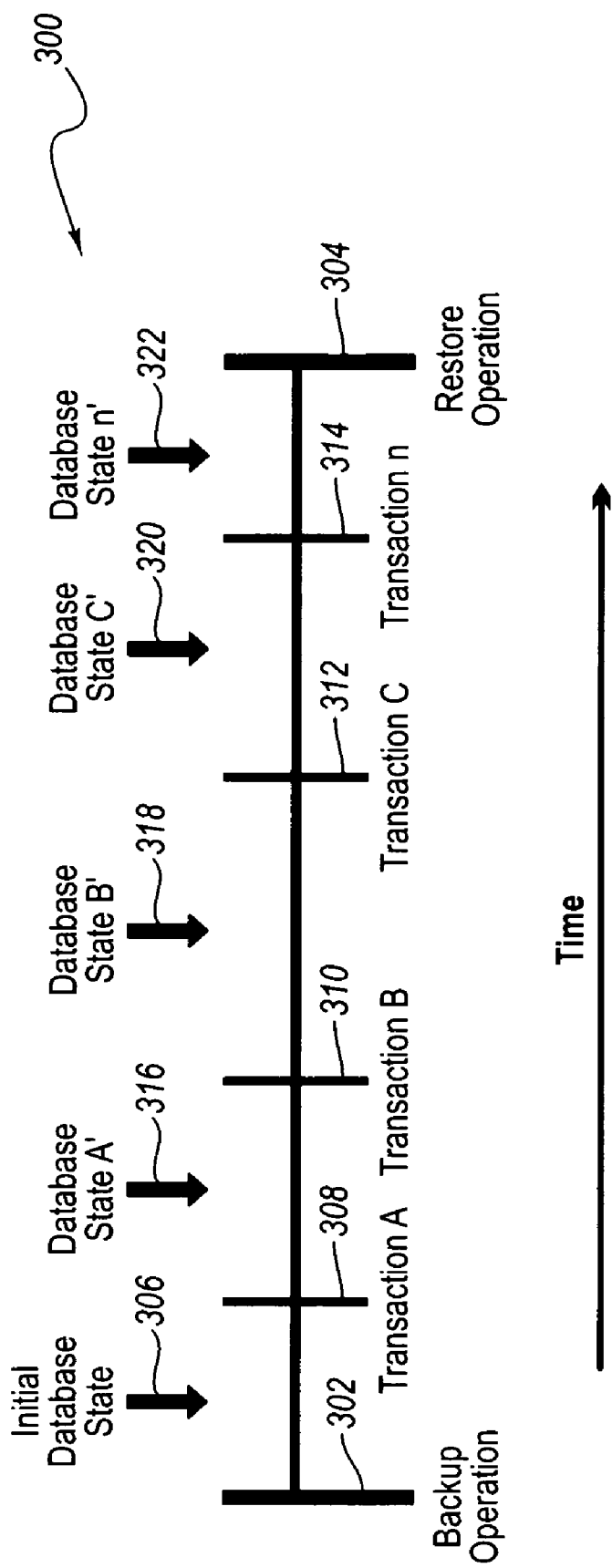
FIG. 3A illustrates an exemplary timeline that discloses aspects of the impact that executing transactions has on database state.
Figure 3B:
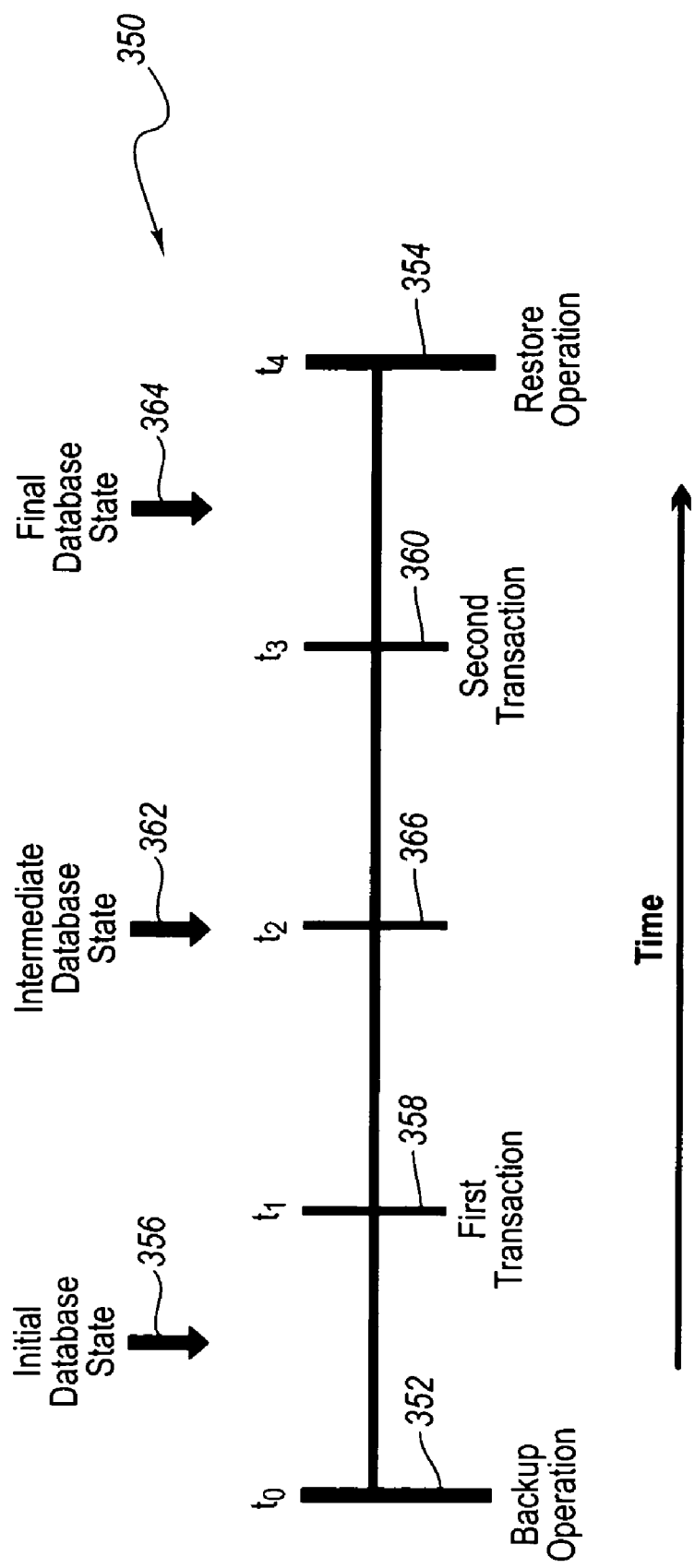
FIG. 3B illustrates a more particular exemplary timeline that discloses aspects of the impact that executing transactions has on database state.

Turning now to FIG. 3B, a more particular description of aspects of the impact that the execution of database transactions has on database state are illustrated in an exemplary timeline 350. Timeline 350 begins at time $t_0$ 352 when a backup operation is performed on the database. Timeline 350 ends at time $t_4$ 354 where a restore operation is performed on the database. With reference to time $t_4$ 354 when the restore operation was performed on the database, the backup operation performed on the database at time $t_1$ 352 is the most recent backup operation performed on the database. Immediately following the time $t_0$ 352 when the backup operation is performed on the database, the database is in an initial database state 356.

In between the performance of the backup and restore operations, two transactions, a first transaction and a second transaction, are executed at times $t_1$ 358 and $t_3$ 360 respectively. After each transaction is executed on the database, the database state changes as a result of the execution of the transaction. For example, after the first transaction is executed at time $t_1$ 358, the database changes from initial database state 356 to an intermediate database state 362. Likewise, after the second transaction is executed at time $t_3$ 360, the database changes from intermediate database state 362 to a final database state 364.

When the database is restored using only the backup made at time $t_0$ 352, the database is restored to the initial database state 356, which was the database state immediately following time $t_0$ 352 when the backup operation was performed. On the contrary, when the database is restored using the backup made at time $t_0$ 352 and all transactions executed on the database prior to time $t_4$ 354 when the restore operation was performed, the database is restored to the final database state 364, which was the database state at time $t_4$ 354 when the restore operation was performed. However, under certain circumstances, it would be desirable to restore a database to the intermediate database state 362 in between the initial database state 356 and the final database state 364. One such circumstance might be where the second transaction, executed at time $t_3$ 360, consisted of the unintentional deletion of critical data from the database.

For example, assume the second transaction, executed at time $t_3$ 360, represents the unintentional deletion of a critical table in the database. This transaction will result in the final database 364, in which state the database is missing the critical table deleted during the second transaction at time $t_3$ 360. That is, the transaction that occurred at time $t_3$ was the deletion of the critical table. In this example, it would be desirable to restore the database to the intermediate database state 362 that existed just prior to the occurrence of the second transaction at time $t_3$ and subsequent to the first transaction at time $t_1$, and thereby restore the deleted critical table to the database. This database restore can be accomplished by restoring the database to a point in time $t_2$ 366, which is in between time $t_1$ 358, when the first transaction finished executing, and time $t_3$ 360, when the second transaction finished executing. Such a restoration process may be referred to herein as a point-in-time restore.

Functionally, this example database restore would involve first restoring the database to the initial database state 356 by replacing the data in the database with the data saved during the backup operation performed at time $t_0$ 352. Second, this example database restore would next involve reexecuting all database transactions executed on the database between time $t_0$ and time $t_2$, which in this example case would consist of reexecuting the first transaction on the database, but in other cases could consist of reexecuting a greater number of transactions. The stages involved in a point-in-time database restore will be discussed in greater detail below in connection with FIGS. 4 and 5.

IV. Exemplary Graphical User Interfaces for Point-In-Time Restore

Figure 4A:
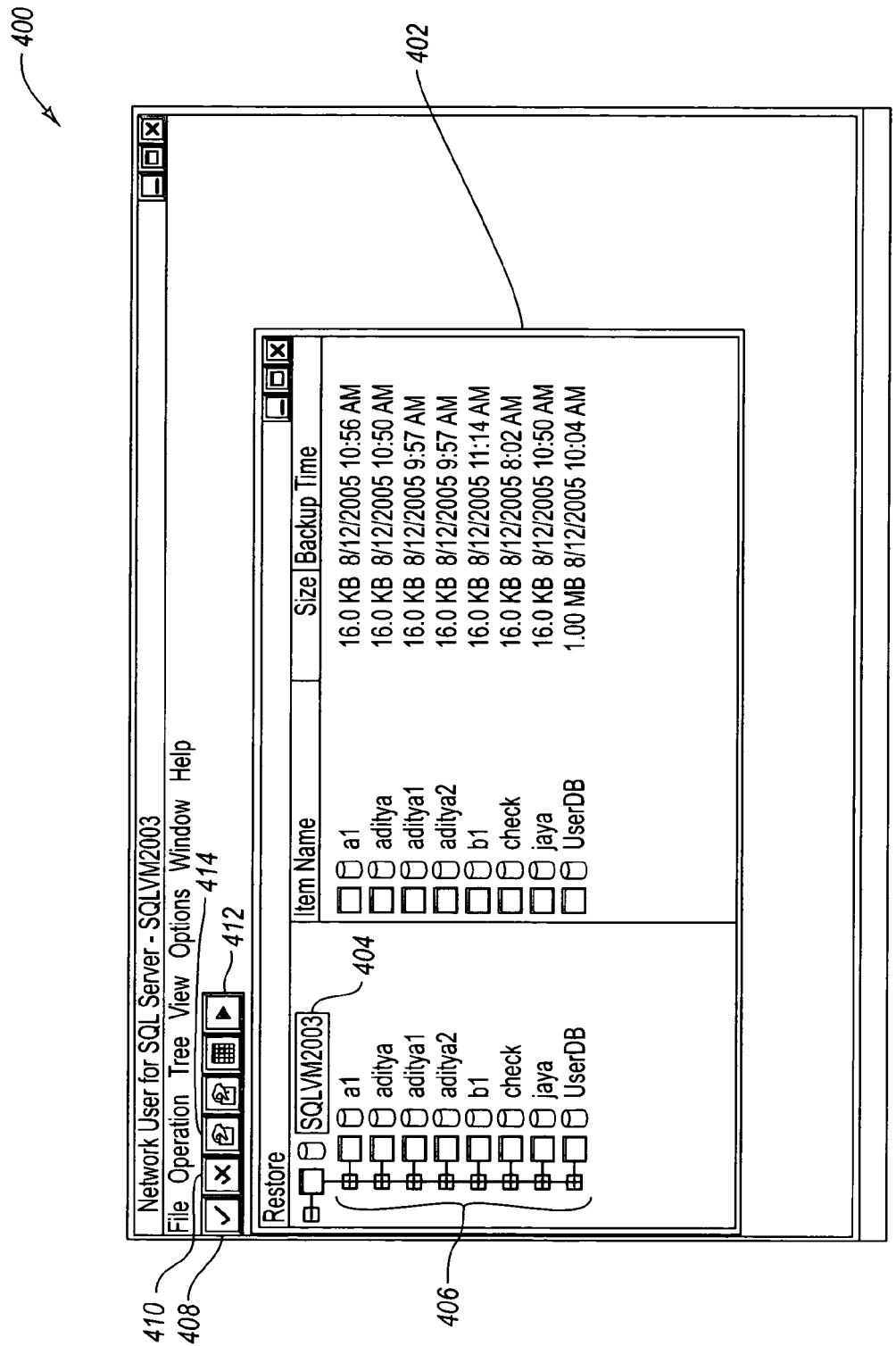
FIGS. 4A, 4B, and 4C illustrate exemplary graphical user interfaces for configuring and executing a point-in-time restore operation.

Each command formulated in order to execute a point-in-time restore operation on user database 206, as described in connection with FIGS. 3A and 3B, can be formulated and executed using a server application module which includes the exemplary graphical user interfaces (GUIs) 400, 420, and 450 illustrated in FIGS. 4A, 4B, and 4C, respectively. In general, the GUI 400 of FIG. 4A is a graphical user interface of a database backup and restore software application, such as server application module 214 of FIG. 2. GUI 400 can be utilized by a database administrator to execute a point-in-time restore operation.

GUI 400 will be automatically presented to the database administrator upon running the underlying database backup and restore software application. GUI 400 could also be configured to be automatically presented to the database administrator upon the occurrence of other triggering events. GUI 400 presents the database administrator with a "Restore" window 402 which identifies a database server 404 as well as a list of databases 406 which reside on the database server 404. Each database is listed next to a checkbox which can be checked by highlighting the database and selecting a check button 408. The checkbox associated with a database can be unchecked by highlighting the database and selecting an uncheck button 410. Each database that is checked by a database administrator will have a point-in-time restore operation performed for that database when the execute button 412 is selected by the database administrator. In one implementation, the GUI 400 allows only one database to be checked prior to selecting the execute button 412 and, therefore, only one database can have a point-in-time restore operation performed each time the execute button 412 is selected. However, in an alternate implementation, GUI 400 may allow multiple databases to be checked prior to the selection of the execute button 412, which, therefore, allows point-in-time restore operations to be executed simultaneously on multiple databases upon the selection of the execute button 412.

As described above, a point-in-time restore operation on a database requires that a point-in-time corresponding to a specific database state be specified. In order to configure the point-in-time restore operation for a database before executing the point-in-time restore operation, a database administrator can highlight a database and select the file properties button 414 in order to open the properties dialog GUI 420 of FIG. 4B.

Figure 4B:
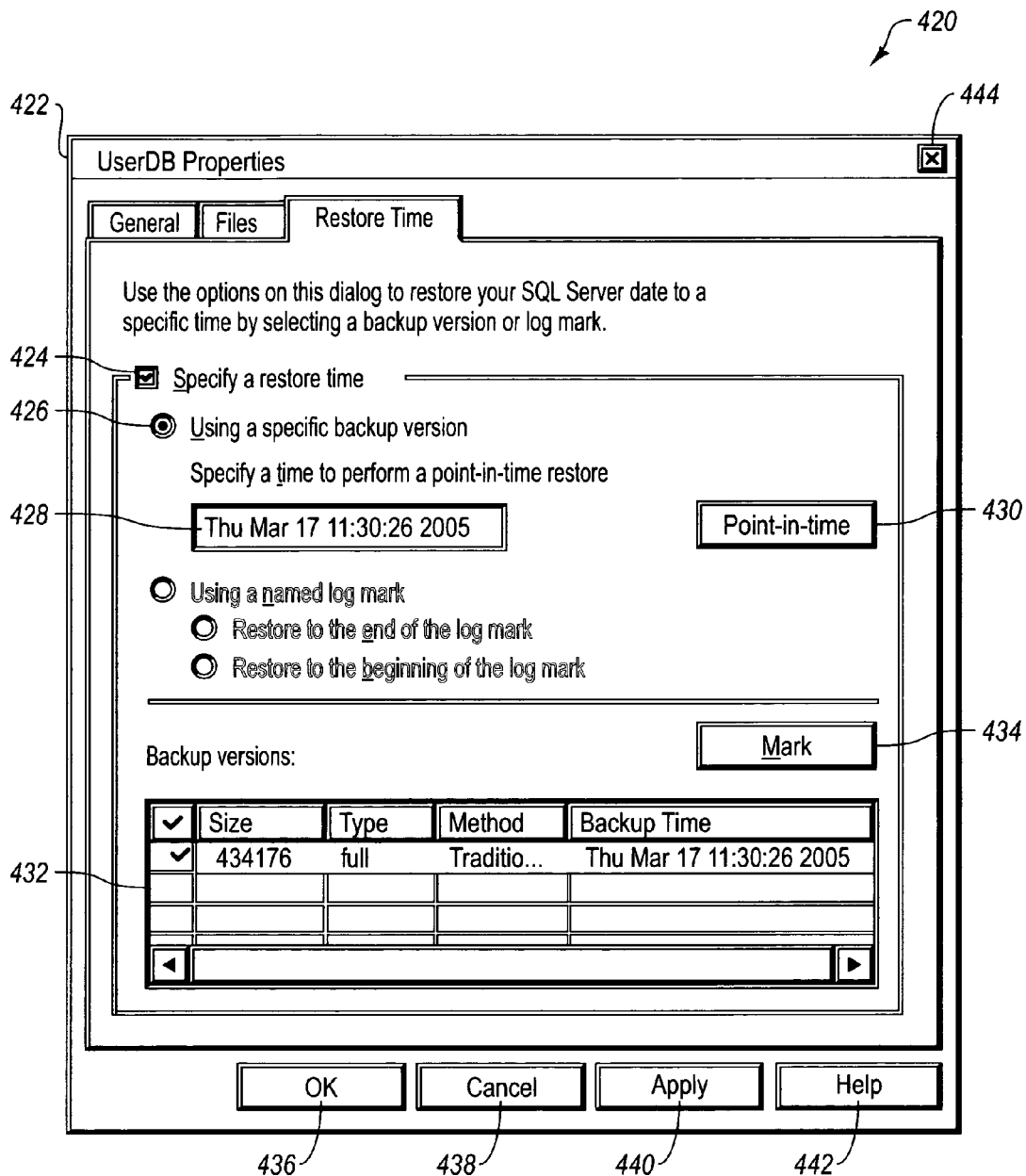

Turning now to FIG. 4B, in general, the GUI 420 is a properties dialog that can be utilized by a database administrator to automatically formulate and configure a command set that, when executed, functions to perform a point-in-time restore operation on a database. By simply initializing GUI 420, the database administrator will automatically be presented with the list of all database backup versions that are available for restoration for the database that was highlighted on GUI 400 of FIG. 4A. A "database backup version" is a database backup file that was created during a particular backup operation. GUI 420 also allows the database administrator to see the time at which each listed backup version was created. Likewise, GUI 420, in conjunction with GUI 450 of FIG. 4C, enables the database administrator to easily specify the point in time at which the database that was highlighted on GUI 400 of FIG. 4A will be restored, as discussed in further detail below.

Upon initialization of GUI 420 of FIG. 4B, a label 422 on GUI 420 identifies the name of the database which was highlighted on the list of databases 406 of GUI 400 of FIG. 4A. GUI 420 also includes several data controls that can be used by a database administrator to configure a point-in-time restore operation.

A checkbox 424 labeled "Specify a restore time" and a radio button 426 labeled "Using a specific backup version" allow the database administrator to change the date in a textbox 428 beneath a label that reads "Specify a time to perform a point-in-time restore" by accessing a button 430 labeled "Point-in-time." The default time listed in textbox 428 when GUI 420 is initialized is the time that the most recent backup version of the database was created. This time can be changed by clicking on "Point-in-time" button 430, as described below.

Figure 4C:
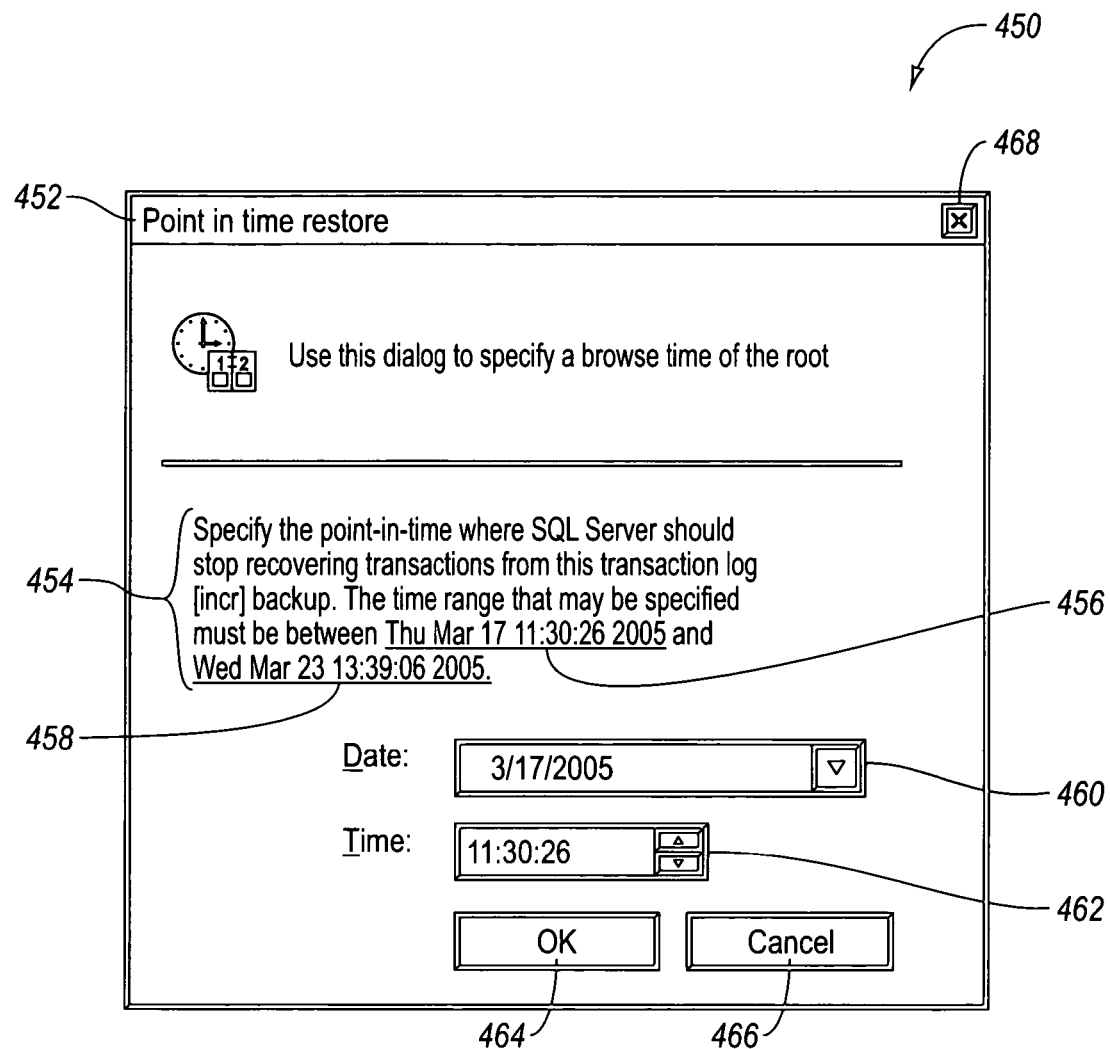

Turning now to FIG. 4C, a GUI 450 is illustrated. GUI 450 is initialized when, as mentioned above, a database administrator selects the "Point-in-time" button 430 of GUI 420. Upon initialization of GUI 450, a label 452 reads "Point in time restore." Likewise upon initialization, a prompt or message 454 is displayed on the GUI 450 which indicates that a point in time should be specified by the database administrator. The message 454 also indicates that the point in time specified should be between a time 456 and a time 458. Time 456 corresponds to the time that the most recent backup version was created for the database. Time 458 corresponds to the time that button 430 was selected by the database administrator and GUI 450 was initialized. Although the message 454 mentions SQL Server specifically in this example, GUI 450 is not limited to use with SQL Server databases, and can alternatively be used in connection with other types of databases and database software applications.

A dropdown 460 allows a database administrator to specify a date between times 456 and 458. An input control 462 allows a database administrator to specify a time between times 456 and 458. The date specified in dropdown 460 together with the time specified in input control 462 comprise the point in time at which the database will be restored. The default date and time in dropdown 460 and input control 462 is the time that the most recent backup version of the database was created.

When the database administrator selects the "OK" button 464, all changes made by the database administrator to the data controls of GUI 450 are saved and GUI 450 is closed. Simultaneously, the date and time entered into dropdown 460 and input control 462 will appear in textbox 428 of GUI 420. When the database administrator selects the "Cancel" button 466 or a button 468, all changes made by the database administrator to the data controls of GUI 450 are discarded and GUI 450 is closed. When the changes made by the database administrator to the data controls of GUI 450 are saved and GUI 450 is closed, the database administrator will be returned to GUI 420.

Returning now to FIG. 4B, as mentioned above, upon initialization of GUI 420, a backup version listing 432 labeled "Backup versions:" is automatically populated with a list of all backup versions for the database that has been selected for restoration. Among the various types of backup versions that can have been created for a database are full backups, incremental backups, and differential backups. A "full backup" is defined herein as a backup version that contains a copy of all data residing in a database at a particular point in time. An "incremental backup" is defined herein as a backup version that contains only the database transaction log. A "differential backup" is defined herein as a backup version that contains a copy of only the data in a database that has been modified since the last full backup. It should be noted that these terms are used for convenience and are not intended to limit the scope of the invention in any way.

When the database administrator selects one of the backup versions listed in backup version listing 432, the selected backup version becomes highlighted. A "Mark" button 434 allows the database administrator to mark the highlighted backup version. A checkmark will appear next to any backup version that is marked, and conversely, no checkmark will appear next to any backup version this is unmarked. In one implementation, only one backup version can be marked at any given time. If one backup version is marked at the time that another backup version is marked by a database administrator, the previously marked backup version will automatically become unmarked. If a full backup version is marked, the marked backup version will be the first backup version restored, followed by any necessary differential or incremental backup versions, during the upcoming point-in-time restore operation. If an incremental or differential backup version is marked, the previous full backup version from which the incremental or differential backup version relies will be the first backup version restored, followed by any necessary differential or incremental backup versions, during the upcoming point-in-time restore operation.

Four buttons at the bottom of GUI 420 provide additional functionality. When the database administrator selects the "OK" button 436, all changes made by the database administrator to the data controls of GUI 420 are saved and GUI 420 is closed. When the database administrator selects the "Cancel" button 438, all changes made by the database administrator to the data controls of GUI 420 are discarded and GUI 420 is closed. When the database administrator selects the "Apply" button 440, all changes made by the database administrator to the data controls of GUI 420 are temporarily saved and GUI 420 remains open. If "OK" button 436 is later selected by the database administrator, the temporarily saved changes are saved permanently. However, if "Cancel" button 438 is later selected by the database administrator, the temporarily saved changes are discarded. Selecting the "Help" button 442 opens a help dialog window (not shown) that describes the functionality of GUI 420. Finally selecting a button 444 results in identical functionality to the "Cancel" button 438, that is, all changes made by the database administrator to the data controls of GUI 420 are discarded and GUI 420 is closed.

When the changes made by the database administrator to the data controls of GUI 420 are saved and GUI 420 is closed, GUI 420 automatically generates a command set that can be executed in order to perform the upcoming point-in-time restore operation for the database identified in label 422 of GUI 420. The command set reflects the input provided by the database administrator and typically includes a command to create a backup copy of a database transaction log that lists all transactions executed on the database since the time that the most recent backup version was created, one or more commands to restore all necessary backup versions, and a command to reexecute all transactions listed in the backup copy of the database transaction log that were originally executed prior to the point-in-time specified in textbox 428.

Among other things then, the exemplary GUIs 420 and 450 of FIGS. 4B and 4C, respectively, eliminate the need for a database administrator to manually formulate queries before executing a point-in-time restore operation of the database in order to determine which backup versions are necessary for the point-in-time restore operation and the time that each backup version was created, since backup versions generally need to be restored in the same order in which they were created. GUIs 420 and 450 also eliminate the need for a database administrator to formulate a command to create a backup copy of the transaction log prior to restoring any backup versions. GUIs 420 and 450 also eliminate the need for a database administrator to formulate commands to the database in order to execute a point-in-time restore operation. Among other things, then, GUIs 420 and 450 simplify the configuration of a point-in-time restore operation for the database administrator.

When the database administrator has configured the upcoming point-in-time restore operation using GUIs 420 and 450 and has closed GUIs 420 and 450, the database administrator will be returned to GUI 400 of FIG. 4A. All the database administrator need do in order to execute the command set that was formulated by GUIs 420 and 450 is select the execute button 412 of GUI 400. By selecting the execute button 412, the one or more commands of the command set will be executed on the database. GUI 400, therefore, enables the database administrator to execute a point-in-time restore operation without formulating any commands or manually sending any commands to the database system. Although GUIs 400, 420 and 450 are illustrated as separate graphical user interfaces, the functionality of GUIs 400, 420 and 450 could be combined into a single user interface or graphical user interface.

V. Exemplary Process for Point-in-Time Database Restore

The main purpose of performing a backup operation on a database is to enable the performance of a restore operation on the database. The need to perform a restore operation can arise under a variety of circumstances, including when data is lost or corrupted. When the need to perform a restore operation arises, a user can often identify the problematic transaction executed on the database which caused the database to become corrupted. By identifying the problematic transaction and the time at which the problematic transaction was executed, the user can identify a point in time just prior to the execution of the problematic transaction at which the database should be restored.

Aspects of an exemplary process 500 for restoring a database to a particular state, considered from a database server application module perspective, are disclosed in FIG. 5 and discussed below in connection with FIGS. 4A, 4B, and 4C. The exemplary process 500 is directed to restoring a database to a particular database state that existed just prior to execution of a particular transaction, as depicted in the exemplary timeline 350 of FIG. 3B.

The process 500 begins at 502 where a database server application module sends a query to a backup server requesting a list of all backup versions for the database. At 504, the database server application module receives the list of all backup versions from the backup server. At 506, the database server application module determines the time $t_0$ at which the most recent backup version in the list was created. At 508, the database server application module identifies a point in time $t_2$ subsequent to time $t_0$. As noted earlier herein in connection with the discussion of FIG. 3B, the time $t_2$ is of interest because time $t_2$ corresponds to a database state that existed subsequent to the time $t_0$ that the most recent backup operation was performed on the database. At 510, the database server application module automatically formulates a command set that, when executed, functions to restore the database to the state that existed at time $t_2$. At 512, the database server application module sends the command set to the database server application. At 514, the database server application module receives confirmation from the database server application that the command set was executed and that the database was restored to the state that existed at time $t_2$. Thus, the exemplary process 500 can be used to restore the database to the state that the database was in at the particular point in time $t_2$.

Implementation of the exemplary process 500 for point-in-time database restore can be further illustrated with reference to the exemplary database system 200 of FIG. 2. At 502, server application module 214, residing on database server 204, sends a query to backup server 202 requesting a list of all backup versions for user database 206. At 504, server application module 214 receives the list of all backup versions from the backup server 202. At 506, server application module 214 determines the time $t_0$ at which the most recent backup version in the list was created. Then at 508, server application module 214 identifies a point in time $t_2$ subsequent to time $t_0$. Identifying the particular point in time $t_2$ enables user database 206 to be restored to a state that existed at time $t_2$.

The particular point in time $t_2$ identified at 508 can be received as input from a user. One example of a situation where a user might specify the particular point in time $t_2$ is where critical data is unintentionally deleted from user database 206. For example, if a user unintentionally deletes a critical table in user database 206 at 5:00:00 p.m. on Apr. 1, 2050, corresponding to time $t_3$, the user might specify a point in time $t_2$ just prior to the deletion of the critical table at time $t_3$, for example 4:59:59 p.m. on Apr. 1, 2050, in a request to perform a restore operation on user database 206. In this example, the user database 206 will be restored to the state that existed just prior to the deletion of the critical table that occurred at time $t_3$. In this way, the critical table is restored to user database 206.

Alternatively, the particular point in time $t_2$ identified at 508 can automatically correspond to a database state that existed just prior to the occurrence of a specified event, such as an unintentional loss of data. One example of a loss of data would be the deletion of a table upon which other tables in a relational database rely for data. For example, if user database 206 were a relational database, at 508 of process 500 server application module 214 could be configured to automatically identify the particular point in time $t_2$ as a time just prior to the deletion of any table upon which one or more other tables rely for their data. Since the deletion of a table upon which one or more other tables rely is designated in this example as the occurrence of a specified event, at 508 of process 500 server application module 214 can be configured to automatically identify a point of time $t_2$ immediately prior to the deletion of such a table.

Figure 5:
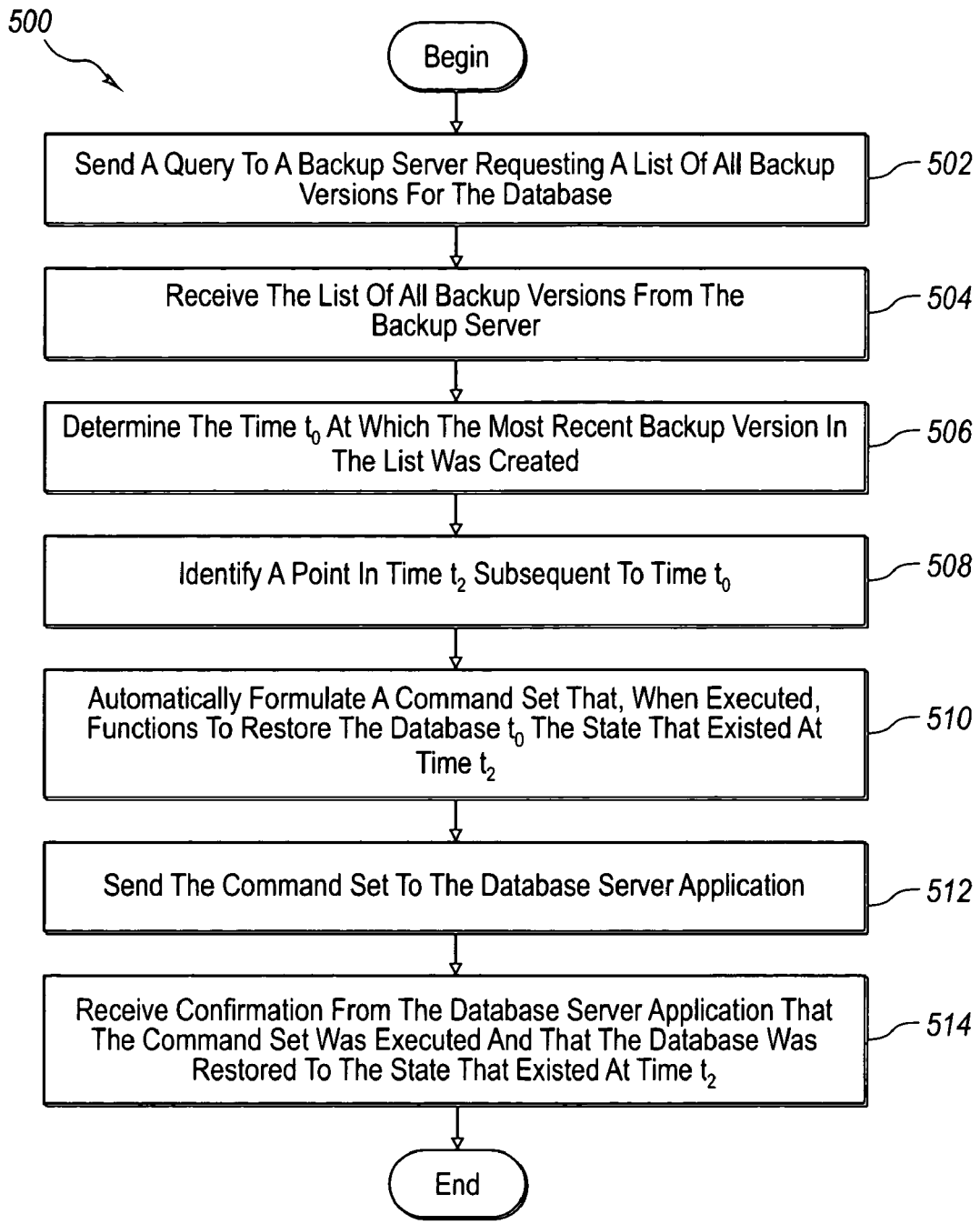
FIG. 5 is a flowchart that discloses aspects of an exemplary process, considered from a database server application module perspective, for restoring a database to a particular state.

With continued reference to FIGS. 2 and 5, at 510, server application module 214 next automatically formulates a command set that, when executed, functions to restore the database to the state that existed at time $t_2$. Automatically formulating a command set is accomplished by processing the information received in the list of all backup versions from the database server. Where the point in time $t_2$ is subsequent to the time that the most recent backup version was created, the command set will include a command to create a backup copy of database transaction log 210 that lists all transactions executed on the database since the time $t_0$, one or more commands to restore the backup versions listed in the list of all backup versions, and a command to reexecute all transactions listed in the backup copy of the database transaction log 210 that were originally executed prior to time $t_2$.

The one or more commands to restore the backup versions listed in the list of all backup versions can be formulated to restore the backup versions in the order that the backup versions were created. Server application module 214 can determine this order by checking the creation time of each of the backup versions and formulating the one or more commands to restore the backup versions in order of the creation times of the backup versions, from oldest to most recent. For example, if there are two backup versions corresponding to user database 206, and the older version is a full backup and the more recent version is a differential backup, the older version will need to be restored before the more recent version in order for the database to be restored properly. At 512, server application module 214 sends the command set to server application 212. After server application 212 executes each of the one or more commands in the command set, at 514, server application module 214 receives confirmation from server application 212 that the command set was executed and that the database was restored to the state that existed at time $t_2$.

Thus, by automatically formulating a command set that, when executed, fuinctions to restore the database to the state that existed at time $t_2$, process 500 can be used to restore user database 206 to the state that user database 206 was in at the particular point in time $t_2$. The command set necessary to restore the database to the state that existed at the particular point in time $t_2$ is thus automatically formulated, without any effort on the part of the user to determine which backup versions need to be restored, or the order of restoration for the backup versions. Likewise, the command to make a backup copy of the transaction log for the database being restored is automatically generated, as well as the command to restore the database to a particular point in time using the backup copy of the transaction log. The point-in-time restore operation is therefore easily implemented because the user is not required to have specific knowledge of command structure and syntax in order to perform the point-in-time restore operation.

VI. Exemplary Process for Point-in-Time Database Restore Using a User Interface

Figure 6:
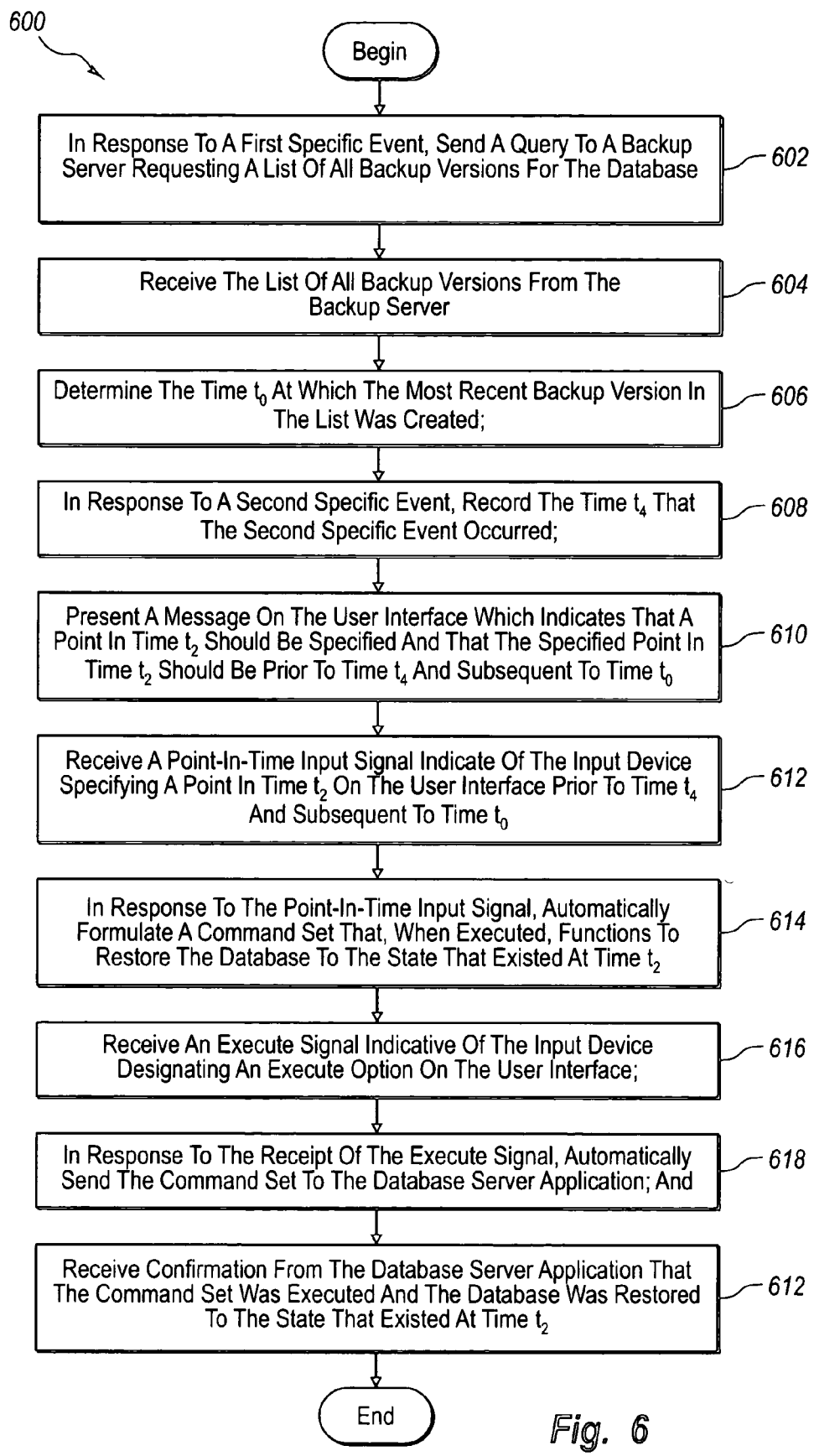
FIG. 6 is a flowchart that discloses aspects of an exemplary process, considered from a database server application module perspective, for restoring a database to a particular state using a user interface.

Turning now to FIG. 6, aspects of an exemplary process 600 for restoring a database to a particular state using an input device and a user interface, considered from a database server application module perspective, are disclosed. The process 600 begins at 602 where in response to the occurrence of a first specific event, the database server application module sends a query to a backup server requesting a list of all backup versions for the database. The first specific event at 602 can be any type of user-initiated or system-initiated event including, but not limited to, the user-initialization or system-initialization of a user interface. For example, if a user initializes GUI 420 by selecting the properties button 414 of GUI 400, this initialization of GUI 420 could be the specific event that triggers the database server application module to query the backup server at 602. In other words, in this example, the database server application module queries the backup server in response to the initialization of a user interface or a graphical display of a graphical user interface. At 604, the database server application module receives the list of all backup versions from the backup server.

At 606, the database server application module determines the time $t_0$ at which the most recent backup version in the list was created. This determination is made by comparing the creation times of each of the backup versions listed in the list of all backup versions. At 608, in response to the occurrence of a second specific event, the database server application module records the time $t_4$ at which the second specific event occurred. The second specific event at 606 can be similar to the first specific event in that the second specific event can be any type of user-initiated or system-initiated event including, but not limited to, the user-initialization or system-initialization of a user interface. For example, if a user initializes GUI 450 by selecting the "Point-in-time" button 430 of GUI 420, this initialization of GUI 450 could be the specific event that triggers the database server application module to record the time $t_4$ that the button 430 was selected.

At 610, the database server application module presents a message on the user interface which indicates that a point in time $t_2$ should be specified and that the specified point in time $t_2$ must be prior to time $t_4$ and subsequent to time $t_0$. The user interface used at 610 can be any conceivable type of user interface, including, but not limited to, a graphical user interface, an auditory user interface, or a tactile user interface such as a braille output interface. For example, the message presented during 610 could be visually displayed to the user on a graphical user interface similar to GUI 450 of FIG. 4C. Likewise, the message could be presented on an audible user interface that presents information audibly to a user. Similarly, the message could be the presented to the user through a tactile user interface such as a braille output interface.

At 612, the database server application module receives a point-in-time input signal indicative of the input device specifying a point in time $t_2$ on the graphical user interface prior to time $t_4$ and subsequent to time $t_0$. If the user interface at 610 is the GUI 450 of FIG. 4C, the point in time input signal can be generated by a user manipulating the dropdown 460 and input control 462 with a pointing device or a keyboard type device. The point-in-time input signal can also be generated in response to a combination of the above mentioned manipulation along with the user selecting the "Ok" button 464 on GUI 450.

At 614, in response to the point-in-time input signal, the database server application module automatically formulates a command set that, when executed, functions to restore the database to the state that existed at time $t_2$. The command set can be similar to the command set described above in connection with FIG. 5.

At 616, the database server application module receives an execute signal indicative of the input device designating an execute option on the graphical user interface. This signal can be generated by a user by selecting the execute button 412 of GUI 400. At 618, in response to the receipt of the execute signal, the database server application module automatically sends the command set to the database server application. At 620, the database server application module receives confirmation from the database server application that the command set was executed and the database was restored to the state that existed at time $t_2$. As with method 500 described in connection with FIG. 5 above, method 600 of FIG. 6 can likewise be implemented in the exemplary system 200 of FIG. 2.

The user interface employed in connection with the exemplary process 600 enables a user to be presented with the opportunity to specify a point in time at which to restore a database. By so doing, the command set necessary to restore the database to the state that existed at the specified point in time is automatically formulated, without any effort on the part of the user to determine which backup versions need to be restored, or the order of restoration of backup versions. Likewise, the command to make a backup copy of the transaction log for the database being restored is automatically generated, as well as the command to restore the database to a particular point in time using the backup copy of the transaction log. The restore operation is therefore made simpler because the user is not required to have specific knowledge of command structure and syntax in order to perform the point-in-time restore operation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for restoring a database to a particular state at a point-in-time, the method comprising:

sending a query from a database server including the database to a backup server requesting a list of all backup versions for the database stored on storage devices, wherein the backup server manages the backup versions using a file index and a media database, the file index includes backed up files and the media database tracks locations at which the backed up files are stored;

receiving at the database server the list of all backup versions for the database from the backup server at a time $t_3$, the backup server including a computing device;

determining at the database server a time $t_0$ at which a most recent backup version in the list was created;

presenting a graphical user interface to specify a restore time for the database and to select a specific backup version from the list of all backup versions for the database;

receiving first input to specify the restore time and identify the specific backup version in the graphical user interface, wherein the restore time identifies the restore time as a point in time $t_2$ subsequent to time $t_0$ and prior to time $t_3$, and wherein the graphical user interface specifies that the restore time is to be selected between the time $t_0$ and the time $t_3$, and wherein the specific backup version occurred at or prior to the time $t_0$;

automatically formulating at the database server a command set from at least the first input, wherein the command set, when executed, functions to restore the database to a state that existed at time $t_2$ by:

automatically identifying particular backup versions included in the list of backup versions which are to be restored based on the specific backup version identified in the first input, the particular backup versions including the specific backup version, wherein the particular backup versions include a prior full backup version and the specific backup version includes an incremental backup;

automatically determining an order in which the particular backup versions are to be restored based on the first input based on an creation times of the particular backup versions; and making a backup copy of a database transaction log for transactions that occurred since the most recent backup of the database during execution of the command set;

restoring the particular backups in the determined order according to the command set; and performing transactions in the backup copy of the database transaction log that occurred after the time $t_0$ and prior to the time $t_2$ after restoring the particular backup versions identified in the command set from the first input, wherein the transaction log is stored at the database server.

2. The method as recited in claim 1, wherein identifying the point in time $t_2$ comprises receiving the point in time $t_2$ as the first input from a user.

3. The method as recited in claim 1, wherein the point in time $t_2$ is identified automatically as corresponding to a time just prior to the occurrence of a specific event.

4. The method as recited in claim 1, wherein the command set comprises:

a command to create the backup copy of the database transaction log that lists all transactions executed on the database since the time $t_0$;

one or more commands to restore the backup versions listed in the list of all backup versions; and a command to reexecute all transactions listed in the backup copy of the database transaction log that were originally executed prior to time $t_2$.

5. The method as recited in claim 4, wherein the one or more commands to restore the backup versions listed in the list of all backup versions are formulated to restore the backup versions in the order that the backup versions were created.

6. The method as recited in claim 1, wherein the list of all backup versions for the database includes at least one of a full backup version, a differential backup version, or an incremental backup version.

7. The method as recited in claim 1, further comprising:

sending the command set to a database server application; and receiving confirmation from the database server application that the command set was executed and that the database was restored to the state that existed at time $t_2$.

8. A method for restoring a database to a particular state, the method comprising:

in response to the occurrence of a specific event, sending a query from a database server including the database to a backup server requesting a list of all backup versions for the database stored on storage devices, wherein the backup server manages the backup versions using a file index and a media database, the file index includes backed up files according to each client and the media database tracks locations at which the backed up files are stored;

receiving at the database server the list of all backup versions from the backup server at a time $t_3$, the backup server including a computing device;

determining at the database server a time $t_0$ at which a most recent backup version in the list of backup versions was created;

presenting a graphical user interface to a user to receive first input that identifies a specific restore time for the restore process and that identifies a specific backup version from the list of all backup versions, wherein the graphical user interface indicates that the specific restore time is to be selected between the time $t_0$ and the time $t_3$;

receiving the first input at the database server, wherein the restore time identifies a point in time $t_2$ subsequent to time $t_o$ and prior to time $t_3$;

in response to the point-in-time input signal:

automatically formulating at the database server a command set based on at least the first input that, when executed, functions to restore the database to the state that existed at time $t_2$, wherein the command set includes one or more commands to restore particular backup versions included in the list of backup versions including the specific backup version, in order of creation times of the particular backup versions, wherein the particular backup versions to be restored are automatically identified from the specific backup version identified via the user interface, wherein the particular backup versions include a prior full backup version and the specific backup version includes an incremental backup; and making a backup copy of a database transaction log for transactions that occurred since the most recent backup of the database;

restoring the particular backups in the determined order according to the command set; and performing transactions in the backup copy of the database transaction log that occurred after the time $t_0$ and prior to the time $t_2$ after restoring the particular backup versions.

9. The method as recited in claim 8, wherein the specific event comprises the initialization of the user interface.

10. The method as recited in claim 8, further comprising presenting a message on the user interface which indicates that the point in time $t_2$ should be subsequent to time $t_o$.

11. The method as recited in claim 8, wherein the command set comprises:

a command to create a backup copy of a database transaction log that lists all transactions executed on the database since the time $t_0$;

one or more commands to restore the backup versions listed in the list of all backup versions; and a command to reexecute all transactions listed in the backup copy of the database transaction log that were originally executed prior to time $t_2$.

12. The method as recited in claim 11, wherein the one or more commands to restore the backup versions listed in the list of all backup versions are formulated to restore the backup versions in the order that the backup versions were created.

13. The method as recited in claim 8, wherein the list of all backup versions for the database include at least one of a full backup version, a differential backup version, or an incremental backup version.

14. The method as recited in claim 8, further comprising:

receiving an execute signal indicative of the input device designating an execute option on the user interface;

in response to the receipt of the execute signal, automatically sending the command set to a database server application; and receiving confirmation from the database server application that the command set was executed and that the database was restored to the state that existed at time $t_2$.

15. A method for restoring a database to a particular state, the method comprising:

in response to a first specific event, sending a query from a database server including the database to a backup server requesting a list of all available backup versions for the database stored on storage devices, wherein the backup server manages the backup versions using a file index and a media database, the file index includes backed up files according to each client and the media database tracks locations at which the backed up files are stored;

receiving at the database server the list of all available backup versions from the backup server, the backup server including a computing device;

determining at the database server a time $t_0$ at which a most recent backup version in the list was created;

in response to a second specific event, recording a time $t_4$ that the second specific event occurred;

presenting a graphical user interface to a user, wherein the user interface is configured to receive first input from the user that identifies a restore time of the database and a specific backup version, wherein the restore time includes a date and time of day between a time of a most recent backup version and a time the user interface was initialized and wherein the graphical user interface indicates that the specific restore time is to be selected between the time $t_0$ and the time $t_3$;

displaying a message on a graphical user interface which indicates that a point in time $t_2$ should be specified and that the specified point in time $t_2$ should be prior to the time $t_4$ and subsequent to the time $t_0$;

receiving a point-in-time input signal indicative of an input device specifying, on the graphical user interface, the restore time which is the point in time $t_2$ prior to time $t_4$ and subsequent to time $t_0$; and in response to receipt of the point-in-time input signal, automatically formulating at the database server a command set that, when executed, functions to restore the database to a state that existed at time $t_2$, the command set comprising:

- a command to create a backup copy of a database transaction log that lists all transactions executed on the database since the time $t_0$, wherein the database transaction log is stored at the database server;
- one or more commands to restore some of the backup versions including the specific backup version listed in the list of all available backup versions based on a type of the specific backup version and to determine an order of restoring some of the backup versions based on creation times of the backup versions restored wherein the backup versions include a prior full backup version and the specific backup version includes an incremental backup; and
- a command to reexecute the transactions listed in the copy of the database transaction log that were originally executed prior to time $t_2$ after restoring the backup versions according to the command set, wherein transactions in the copy of the data transaction log after time $t_2$ are not executed.

16. The method as recited in claim 15, wherein the first specific event comprises the initialization of a graphical display of the graphical user interface.

17. The method as recited in claim 15, wherein the second specific event comprises the initialization of a graphical display of the graphical user interface.

18. The method as recited in claim 15, wherein the one or more commands to restore the backup versions listed in the list of all backup versions are formulated to restore the backup versions in the order that the backup versions were created.

19. The method as recited in claim 15, wherein the list of all backup versions for the database include at least one of a full backup version, a differential backup versions, or an incremental backup version.

20. The method as recited in claim 15, further comprising:
- receiving an execute signal indicative of the input device designating an execute option on the graphical user interface;
- in response to the receipt of the execute signal, automatically sending the command set to a database server application; and
- receiving confirmation from the database server application that the command set was executed and the database was restored to the state that existed at time $t_2$.

* * * * *